(12) United States Patent
Kile

(10) Patent No.: X9103
(45) Date of Patent: Sep. 18, 1835

(54) LOOM, WEAVING, STOCKS

(76) Inventor: Conrad Kile

Conrad Hile Erie Penn.

Letters Patent

The schedule referred to in these Letters Patent and making part of the same containing a description in the words of the said Conrad Hile himself of his improvement in constructing looms for weaving the Cloth for making Stocks.

To all to whom these presents shall come Be it known that I Conrad Hile of Erie in the County of Erie and State of Pennsylvania have invented a new and useful improvement in the Loom for weaving Stocks and that the following is a full and exact description of the construction ~~of the [illegible]~~ and operation of the said machine as invented or improved by me. The frame work may be made after the usual manner of putting together looms. I also use the beam upon which the warp is wound; also that upon which the cloth is wound, and that on which it is strained all in their usual situations but my improvement consists in the form or mode of constructing them and is grounded on the following requisite to make the Stock set closely to the neck and accommodate itself to the shape; viz that the selvage should be much longer than the centre of the cloth so that while the centre of the Stock fits the neck closely the selvage both at top and bottom is so loose as to yield easily to the passage of the chin after the manner generally effected by inserting pieces of an angular shape around the top and bottom. This object of increasing the length of the selvage I effect by means of the shape I give the beams above mentioned, on their circumference for instead of their being straight across from one end to the other I form them with a concave circumference so proportioned that the girth of the centre of the beam is about one third less than that of each end and increases in a gradual swell till it arrives at its full height on each end thereof. This causes the warp to assume a semi-circular shape and as more threads are requisite towards the selvage in order to stiffen and cause the cloth to retain its shape they are warped on the beam from bobbins by which means the number may be increased towards the selvage at pleasure. In order to prevent the warp from slipping down as it rises up the sides of the concave, I place a number of pins rising perpendicularly from the Surface and [illegible] Small
So as not to interrupt the winding of the warp, upon or off the beam; A ratchet
wheel and hand is applied thereon as usual; the yarns through which the
ends of the warp are passed are brought into the requisite Semi-Circular Shape
by means of the bars on the top having their upper side cut into the same Con
-cave as the beam; and the bottom of the lower bar cut into a Convex of the Same
proportions which brings the loops of the Straight yarns into the requisite Curve; The
ends of the warp are brought over the Straining beam in front and round onto
the Cloth beam beneath this said Straining beam which has such a portion
of its under Surface Scooped out as to admit the Cloth beam to fit or work
in this hollowed place, the latter being about one half the Circumference of the
former (though the length will be the Same) and consequently the Concavity
of the latter will be in the Same proportion say one half or whatever other
proportion may be used. The Cloth beam is also sufficiently in the front of the
hollow beneath the Straining beam to bring the line of Concavity of the former
to correspond as nearly as possible with that of the latter so that the Cloth has
no hindrance in passing from one to the other in the Same Semi-Circular
Shape and the Straining beam is allowed to be loose upon its axis so that as
the Cloth beam fills up it continues to press against the upper part of
the hollow and consequently causes the former to revolve and leave room
for the accumulation of the Cloth. A hand and ratchet wheel are
adapted to the Cloth beam as usual, I construct my reed and [illegible] in a
different manner from the common principle it being necessary to suit it
to the Concavity of the beam. This I effect by giving to the lower bar into which
the reeds (or rather their strips of Steel such as Clocks springs) are secured,
the Same Semi-Circular Shape as the Straining beam so as to fit the cir
-cumference exactly and it must also be brought into a sharp edge, I find
that metal suits this purpose better than wood and on the upper or sharp
edge slits are cut for the reception of the Steel reeds which when placed
around of course assume the curved Shape of the metal plate and ex
-actly fit the hollow of the beam. They are then Soldered and Secured.
The upper or top bar is made straight as usual and if of wood it must
still have a metal plate (though without a sharp edge) into the slits of which the ends of the steel teeth are soldered and secured. Uprights at each
end either of metal or wood are used to support the ends of the top & bottom
plates so as to keep them steady and by means of a mortice and tenon with
a thumb screw these pieces or plates may be released, and the reed changed
for another, the mode of operating my reed being different from the common
method I connect to the bottom of each upright an arm in the same plane
but in an obtuse angle though not much more than a right angle which
is to be sufficiently long to reach to the axle of the straining beam on which
it is secured so as to play or revolve on said axis one arm being placed on
each end and is to be sufficiently long just to bring the sharp edge of the
reed close upon the circumference of the convexity consequently to cause it by
the motion given to the reed to revolve at a regular distance around the
said beam. The arrangement of the treadles &c. is the same as other looms
which are to be more or less according to the pattern intended to be produced
which can be carried on this loom as well as any other. In operating the
warp is opened by the motion of the treadles and by means of a small
shuttle one shot is made to pass through a thread either of cotton or silk
then a bristle is placed and then another shot made and so on to suit
the intention of the weaver. I prefer adding the thread for the purpose of
preventing the bristles from slipping out. Now it will be seen that at
each bang of the reed the sharp edge brings the bristles straight by the
side of each other in the plane of a section through the diameter by which
means they are not strained out of a straight line or straight by the side of
each other otherwise than according to the curve of the beam. & there the in
creased quality of warp prevents the possibility of their ever falling flat
again. I propose to construct my looms to work not only singly but con
nectedly as power looms &c. The quantity of chain is increased at
much outer line [illegible] selvage as to fill up so much of the space between the
bristles as will be requisite to give the cloth a uniform clean appearance
What I claim as my invention in the above described machine and not
previously known is the concave shape I give to all my beams & to the [illegible]
and secondly the manner of making the lower semi circular bar of the
reed, lastly the manner of joining the uprights of the reed by means of

United States Patent

Patent No.: X9103 arms to the axis of the straining beam as already described & [illegible] that intent.
In testimony that the above is a full, clear, and exact description of the construc-
tion and operation of the said machine as invented or imp^d by me I
have hereunto set my hand this thirtieth day of July eighteen hundred
and thirty five.

Witnesses
C. H. W. Wharton
Henry Stone

Conrad Hite

[1500 wds]

(Patented 18 Sept^r 1835)